(12) United States Patent
Bucknell et al.

(10) Patent No.: US 11,006,300 B2
(45) Date of Patent: May 11, 2021

(54) MEASUREMENT CONFIGURATION SIGNALLING IN 5G

(71) Applicant: FUJITSU LIMITED, Kawasaki (JP)

(72) Inventors: Paul Bucknell, Peacehaven (GB); Xusheng Wei, Staines (GB)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/514,172

(22) Filed: Jul. 17, 2019

(65) Prior Publication Data

US 2019/0364447 A1    Nov. 28, 2019

Related U.S. Application Data

(63) Continuation of application No. PCT/GB2017/052301, filed on Aug. 4, 2017.

(30) Foreign Application Priority Data

Jan. 31, 2017    (GB) ...................................... 1701536

(51) Int. Cl.
*H04W 24/08*    (2009.01)
*H04W 72/04*    (2009.01)

(52) U.S. Cl.
CPC ......... *H04W 24/08* (2013.01); *H04W 72/046* (2013.01)

(58) Field of Classification Search
CPC ............... H04W 24/08; H04W 72/046; H04W 36/0088; H04W 24/10
See application file for complete search history.

(56) References Cited

U.S. PATENT DOCUMENTS

| 2015/0067523 | A1  | 3/2015 | Lee et al. |
| 2015/0092578 | A1* | 4/2015 | Ingale ............... H04W 52/0209 370/252 |
| 2015/0124731 | A1  | 5/2015 | Tsuboi et al. |

(Continued)

FOREIGN PATENT DOCUMENTS

| EP | 2 854 440 A1 | 4/2015 |
| JP | 2013-243508 A | 12/2013 |

OTHER PUBLICATIONS

Search Report issued by the Intellectual Property Office for corresponding Patent Application No. GB1701536.3, dated Jun. 30, 2017.

(Continued)

*Primary Examiner* — Kiet Tang
(74) *Attorney, Agent, or Firm* — Myers Wolin, LLC

(57) ABSTRACT

In LTE a measurement configuration message, which instructs a terminal (10, 11, 12) on when to transmit a measurement report, is per frequency carrier dependent. A measurement object configuration for 5G/NR wireless communication is provided which is independent of carrier frequency, allowing multiple measurement objects to be configured for one particular carrier frequency. Each measurement object can be defined over a particular time duration (T1, T2, T3), frequency range, time/frequency grid, beam, and/or a particular frequency carrier (Layer 1, Layer 2) in order to satisfy various requirements on RRM measurement of NR. Thus, for a particular terminal (10, 11, 12) and a particular carrier frequency, a base station (20, 21, 22, 23) can define multiple measurement objects over different time/frequency grids.

14 Claims, 4 Drawing Sheets

(56) References Cited

U.S. PATENT DOCUMENTS

| | | | |
|---|---|---|---|
| 2015/0230286 A1* | 8/2015 | Feuersaenger | H04W 24/10 370/252 |
| 2016/0150435 A1 | 5/2016 | Baek et al. | |
| 2016/0337916 A1 | 11/2016 | Deenoo et al. | |
| 2018/0102887 A1* | 4/2018 | Chen | H04L 5/0048 |
| 2018/0367382 A1* | 12/2018 | Zhang | H04W 72/042 |
| 2019/0327629 A1* | 10/2019 | Zhang | H04B 7/0626 |

OTHER PUBLICATIONS

ZTE, ZTE Microelectronics, "Consideration on the RRM Measurement for NR," Agenda item: 9.3.1.1.1, 3GPP TSG-RAN WG2 Meeting #96, R2-167836, Reno, NV, USA, Nov. 14-18, 2016.

International Search Report and Written Opinion of the International Searching Authority for corresponding International Patent Application No. PCT/GB2017/052301, dated Oct. 17, 2017.

Nokia et al., "On RRM Measurement Reporting in NR," Agenda item: 3.3.1.1.1, 3GPP TSG-RAN WG2 NR Adhoc, R2-1700125, Spokane, WA, USA, Jan. 17-19, 2017.

Huawei et al., "Measurement and Mobility in high frequency," Agenda item: 3.3.1.1.1, 3GPP TSG-RAN2 Meeting #Adhoc, R2-1700166, Spokane, Washington, USA, Jan. 17-19, 2017.

Notice of Reasons for Refusal issued by the Japan Patent Office for corresponding Japanese Patent Application No. 2019-539838, dated Jun. 16, 2020, with a full English machine translation.

ZTE et al., "Consideration on the RRM Measurement for NR", Agenda Item: 9.3.1.1.1, 3GPP TSG-RAN WG2 Meeting #96, R2-167836, Reno, USA, Nov. 14-18, 2016.

Huawei et al, "Measurement and Mobility in high frequency", Agenda Item: 3.3.1.1.1, 3GPP TSG-RAN WG2 Meeting #Adhoc, R2-1700166, Spokane, Washington, USA, Jan. 17-19, 2017.

* cited by examiner

MEASUREMENT CONFIGURATION SIGNALLING IN 5G

CROSS REFERENCES TO RELATED APPLICATIONS

This application is a continuation application of International Patent Application No. PCT/GB2017/052301, filed Aug. 4, 2017, and claims priority to United Kingdom Patent Application No. GB1701536.3 filed Jan. 31, 2017 the contents of each are herein wholly incorporated by reference.

FIELD OF THE INVENTION

The present invention relates to a wireless communication method in which terminals connect to cells in a wireless network. The present invention further relates to a wireless communication system that includes a a terminal and a base station for use in said method.

Particularly, but not exclusively, the present invention relates to the design of measurement configuration signalling in a "5G"/"NR" (New Radio) wireless communication system.

BACKGROUND OF THE INVENTION

Wireless communication systems are widely known in which terminals (also called user equipments or UEs, subscriber or mobile stations) communicate with base stations (BSs) within communication range of the terminals.

The wireless communication system typically employs a given carrier frequency (also referred to below as "frequency layer" or "component"). The different geographical areas served by one or more BSs are generally referred to as cells, and typically many BSs are provided in appropriate locations so as to form a network covering a wide geographical area more or less seamlessly with adjacent and/or overlapping cells. (In this specification, the terms "system" and "network" are used synonymously). Each BS may support one or more cells and in each cell, the BS divides the available bandwidth, i.e. frequency and time resources, into individual resource allocations for the UEs which it serves. In this way, a signal transmitted in the cell and scheduled by the BS has a specific location in the frequency and time domains. The terminals are generally mobile and therefore may move among the cells, prompting a need for handovers between the BSs of adjacent cells. A terminal may be in range of (i.e. able to detect signals from and/or communicate with) several cells at the same time, but in the simplest case it communicates with one "serving" cell.

Current, "4G" systems include those based on the set of standards referred to as Long-Term Evolution or LTE, produced by the 3rd Generation Partnership Project (3GPP), and in which terminals are referred to as UEs (user equipments) and base stations include so-called eNBs (evolved NodeB). LTE supports frequency-division duplex (FDD), where uplink and downlink transmission are separated in frequency, as well as time-division duplex (TDD), where uplink and downlink are separated in time. LTE uses orthogonal frequency-division multiplexing (OFDM), which divides the available system bandwidth into multiple orthogonal subcarriers in the frequency domain and into multiple OFDM symbols in the time domain. It is expected that future 5G/NR systems will likewise employ OFDM. Base stations (eNBs in LTE) are proposed to be referred to as "gNB" in 5G/NR.

Nowadays mobile access to Internet or another mobile point is becoming a crucial necessity for both business and personal life and there are significant challenges to the current wireless systems due to the popularity of new applications such as social networking, cloud based services and big data analysis. With the forthcoming services such as Internet of things and ultra-reliable, mission-critical connections, a next-generation Radio Access Technology (RAT) to succeed LTE/LTE-A and known as "5G" or "NR" (New Radio) will be needed to satisfy all those demanding requirements. FIG. 1 illustrates the demands which 5G systems will be required to meet (source: "Looking ahead to 5G", Nokia White Paper).

As shown in FIG. 1, simultaneous requirements to be met comprise greatly increased traffic; many more devices; reduced latency; low-power and low-cost solutions for Machine-to-Machine (M2M) devices; and increased peak and guaranteed data rates. The intention of 5G is to satisfy all requirements of these applications and ideally, 5G could provide at least the following features:

Ultra-reliable connection in addition to higher data rate, higher capacity and higher spectral efficiency;

Unified user experience together with significant reduction on latency;

Scalability/adaptability to applications with significant different Quality of Service (QoS) requirements;

Access all spectrum and bands and support different spectrum sharing schemes.

From the properties of traffic profiles point of view, 5G is to support three profiles with significant different properties, namely:

(i) high throughput with high mobility traffic;

(ii) low-energy consumption and long lived sensor-based services; and (iii) extremely low latency and high reliability services.

From the industry point of view, 5G will not only provide traditional voice and data services but also expand and penetrate to other industries such as automotive, agriculture, city management, healthcare, energy, public transportation etc., and all these will lead to a large ecosystem which has never experienced before.

The technical challenges for designing such a sophisticated and complicated system are tremendous and significant breakthroughs will be required both on the network side and in the radio interface. Regarding the physical layer of the radio interface, a few new techniques will be introduced in order to support aforementioned 5G requirements. One important objective of studies in 3GPP is to investigate fundamental physical layer designs such as waveform design, basic numerology and frame structure, channel coding scheme(s) and so on to meeting key 5G requirements.

From a spectrum point of view, in the longer term, much more spectrum will be available to meet traffic demand. Nowadays, spectrum for mobile communication has focused on the frequencies below 6 GHz. In the time frame of 2020 to 2030, more spectrum at the high frequencies such as 6 GHz, 10 GHz or even up to 100 GHz will be considered. At the same time larger bandwidth spectrum will be available at these extreme higher frequency bands.

More detailed information is provided in Table 1 (source: Ofcom, "Spectrum above 6 GHz for future mobile communications", February 2015).

TABLE 1

Possible spectrum allocation for 5G and beyond

| Spectrum | Possible allocation |
|---|---|
| 5 GHz | This band is being considered at the ITU World Radio Conference in 2015 (WRC-15) - in total over 300 MHz in new spectrum could be allocated<br>If agreed at WRC-15, a contiguous band from 5150 to 5925 MHz would be created using a combination of existing and new spectrum<br>Channel sizes likely based on current Wi-Fi use, in multiples of 20 MHz, and the band may remain as a licence-exempt band in line with current Wi-Fi |
| 15 GHz | Potentially over 500 MHz contiguous spectrum depending on the sub-band used and sharing with existing uses<br>Very high speeds are achievable - for example, peak speeds of 5Gbps have been demonstrated already<br>Channel sizes could be very wide, for example, multiples of 100 MHz |
| 28 GHz | Similar to the 15 GHz band, for example, over contiguous 500 MHz of spectrum depending on the sub-band used and sharing with existing uses<br>Channel sizes could be very wide, for example, multiples of 100 MHz<br>Depending on the bandwidth available, the band could accommodate multiple operators with the opportunity for companies other than established mobile operators to offer some 5G services with an assignment of 100 MHz per operator, or more, depending on national availability and sharing with existing services. |
| 60-80 GHz | Potentially up to 5 GHz of contiguous spectrum depending on the selected sub-band (for example, 71-76 MHz and/or 81-86 GHz)<br>Channel sizes could be very wide, for example, multiples of 100 MHz<br>Depending on the bandwidth available, the band could accommodate multiple operators with the opportunity for companies other than established mobile operators to offer some 5G services with a 100 MHz assignment per operator, or more, depending on national availability and sharing with existing services. |

The radio propagation characteristics at the extreme high frequencies such as spectrum above 6 GHz, brings more challenges compared with that of spectrum at 2 GHz, which is the typical spectrum of 3G/4G. These challenges are the large free space loss, poor penetration/scattering properties and possible non-existing line of light path. Despite these challenges, extreme high frequencies also have their advantages such as large bandwidth availability. Carrier spacings may be adapted to suit the bandwidth(s) available.

Another advantage of high frequencies is that the size of antennas can be small, which means dense antenna array is more feasible to be used for extreme high frequency scenario. With dense antenna array, it is easily for a mobile network to exploit benefits of beam-forming technique. Digital beamforming and analog beamforming are two typical types of beamforming. Theoretically, the difference between them is at a particular time instance the analog beamforming builds a single beam using several tens of antennas, to cover a limited area with smaller power consumption and hardware usage; whereas digital beamforming can have multiple beams to cover a relative wide area with more power consumption and more hardware cost. Sometimes the network can use these two beamforming techniques simultaneously.

The possibility of using various frequency bands leads to the concept of "numerology". This is a special term used for NR to describe a set of parameters for OFDM. For example numerology 1 has a 15 KHz carrier spacing, a particular OFDM symbol period and a particular cyclic prefix length. "numerology 2" may have a 30 kHz carrier spacing, a particular OFDM symbol length (with is half of that of the numerology with 15 kHz), a particular cyclic prefix length.

Returning to the LTE system, in the frequency domain transmissions occur within at least one frequency band and in the time domain, transmission is organized in "frames" which are subdivided into "subframes". In one frame structure used in LTE, a 10 ms frame is divided into 10 subframes each of 1 ms duration, as illustrated in the top left-hand corner of FIG. 2. Below the frame in FIG. 2, one subframe is shown having a duration of two slots, each slot consisting (in this example) of six physical resource blocks (PRBs). More generally, depending on the system bandwidth, anywhere between 6 and 110 PRB pairs compose each 1 ms subframe. The right-hand part of FIG. 2 illustrates one PRB pair as a resource grid with time (symbols) along the horizontal-axis and frequency (subcarriers) along the vertical-axis. Each PRB extends over seven OFDM symbols in the time domain and twelve subcarriers in the frequency domain. Thus, each PRB pair provides a total of 14*12 distinct time/frequency locations represented by the small squares in the Figure. More generally, any arbitrary area on a resource grid like that of FIG. 3—in other words a set of resources extending in both time and frequency domains—is referred to below as a time/frequency grid.

As part of Radio Resource Management (RRM), terminals need to measure each communication channel between itself and a given cell in order to provide appropriate feedback to that cell. To facilitate measurements of the channel by terminals, reference signals are transmitted by the cells. Various kinds of reference signal (or symbol) are provided in LTE, but for present purposes the most notable are the Cell-specific Reference Signal (CRS), which is cell specific and available to all terminals in a cell, a Channel State Information Reference Signal CSI-RS used by a terminal to report CSI feedback, and a discovery reference signal (DRS), used to replace the CRS when a cell is in the off mode. In order to support mobility functionality within LTE, a terminal will perform RSRP (Reference Signal Received Power) and RSRQ (Reference Signal Received Quality) measurement, both are based on the cell-specific reference signal (CRS). Such measurements provide the UE with the capability of timely detection and identification of the best suitable network nodes available for potential connection. In addition they allow the network to get the information regarding the radio conditions that a particular UE is experiencing. In LTE, measurement activities is controlled by UE under the RRC_IDLE state and within RRC_CONNECTED state, measurement is configured by eNB and a terminal will follow eNB's instruction to perform measurement.

The CRSs are transmitted on certain resources in every PRB and every subframe. Within the PRB pair, as shown in the resource grid at the right-hand side of FIG. 2, the CRS are distributed in a predetermined pattern. The locations of individual reference symbols are marked as R0, R1, R2 and R3. Incidentally, a distinction may be drawn between a "reference symbol", and a "reference signal" which can be defined as a set or pattern of reference symbols. However the two terms are often used synonymously.

Except for shifts at the frequency domain, the CRS pattern of a particular antenna port is identical over the full system bandwidth and repeats itself over the time domain. When a UE is in RRC_CONNECTED state, when and how to execute measurement is controlled by eNB through measurement configuration. The measurement configuration is sent to the UE by means of dedicated signalling, typically using the "RRCConnectionReconfiguration" message.

The measurement configuration message sent to the UE includes the following key components:
  Measurement objects: The objects on which the UE shall perform the measurements; i.e. frequencies and cells. In other words: what should the UE measure? These include intra- and inter-frequency neighbours in the LTE network, and possibly also objects in networks of other RATs such as UMTS (Universal Mobile Telecommunication System) or GSM (Global System for Mobile Communications).
  Reporting configurations: A list of reporting configurations, in other words the criteria used by the UE to trigger the transmission of a measurement report and the quantities that the UE includes in the report. The reporting configurations define when should the UE send a report. The trigger can either be periodical or event-based. Each reporting configuration consists of the following:
    Reporting criterion: The criterion that triggers the UE to send a measurement report. This can either be periodical or a single event description.
    Reporting format: The quantities that the UE includes in the measurement report and associated information (e.g. number of cells to report).
  Measurement identities: the UE needs to keep track of the objects to be measured and their specific triggers; therefore it maintains a list of measurement identities where each measurement identity links one measurement object with one reporting configuration. The measurement identity is used as a reference number in the measurement report. By configuring multiple measurement identities it is possible to link more than one measurement object to the same reporting configuration, as well as to link more than one reporting configuration to the same measurement object. Each measurement identity (MID) is configured to link one measurement object (MO) with one measurement reporting configuration (RC) and is used as a reference number in the measurement report. So by configuring multiple MIDs in LTE, it is possible to link more than one MO to the same RC, as well as to link more than one RC to the same MO, which is illustrated in FIG. 3.

The UE maintains a single measurement object list, a single reporting configuration list and a single measurement identities list. Any measurement object can be linked to any reporting configuration of the same Radio Access Technology (RAT) type.

As mentioned earlier, a report can be event-triggered or periodical. As FIG. 3 shows, each RC includes an "event" representing the above mentioned trigger for transmission of a measurement report. The measurement report will be transmitted when the criteria for any of the following events have been met:
  A1: Serving Cell becomes better than a defined threshold
  A2: Serving Cell becomes worse than a defined threshold
  A3: Neighbor cell becomes some offset better than the primary cell
  A4: Neighbor cell becomes better than a defined threshold
  A5: Primary cell becomes worse than a defined threshold and a neighbor becomes better than a second threshold
  A6: Neighbor cell becomes some offset better than the serving cell
  B1: Inter-RAT neighbor becomes better a defined threshold
  B2: Primary cell becomes worse than a defined threshold and inter-RAT neighbor becomes better than a second threshold The UE performs measurements at the physical layer, Layer 1, and it reports them to the Layer 3 (network). The 3GPP specifications contain information about the accuracy of the measurements. These accuracy specifications are part of the Layer 1 filtering of the measurements prior to sending a report, usually performed over a period of 200 ms. In order to improve the measurements accuracy and mitigate the effects of fading, Layer 3 filtering is applied to the physical layer measurements. Thus the raw measurements from Layer 1 are further averaged at Layer 3. The updated filtered measurement result is used for evaluating the reporting criteria or for measurement reporting.

Periodical measurement reports are sent based on the reporting configuration. For instance, it could be configured that the UE report its transmit power every 2 seconds or its transport channel block error rate every second.

To explain measurement object configuration in more detail, in LTE the format to define a measurement object configuration (as specified in 3GPP TS 36.331) is called ASN.1, a formal notation used for describing data transmitted by telecommunications protocols. The definition of ASN.1 can be found at http://www.itu.int/en/ITU-T/asn1/Pages/introduction.aspx.

Some relevant parts of the specification and the conventional measurement object configuration in LTE, "MeasObjectEUTRA", followed by definitions of the various constituent fields of the configuration, are given below.
  Field identifiers shall start with a lowercase letter and use mixed case thereafter, e.g., establishmentCause. If a field identifier begins with an acronym (which would normally be in upper case), the entire acronym is lowercase (plmn-Identity, not pLMN-Identity). The acronym is set off with a hyphen (ue-Identity, not ueIdentity), in order to facilitate a consistent search pattern with corresponding type identifiers.
  Identifiers that are likely to be keywords of some language, especially widely used languages, such as C++ or Java, should be avoided to the extent possible.

```
MeasObjectEUTRA ::=                   SEQUENCE {
    carrierFreq                           ARFCN-ValueEUTRA,
    allowedMeasBandwidth                  AllowedMeasBandwidth,
    presenceAntennaPort1                  PresenceAntennaPort1,
    neighCellConfig                       NeighCellConfig,
    offsetFreq                            Q-OffsetRange                       DEFAULT dB0,
    -- Cell list
    cellsToRemoveList                     CellIndexList                       OPTIONAL,        -- Need ON
    cellsToAddModList                     CellsToAddModList                   OPTIONAL,        -- Need ON
    -- Black list
    blackCellsToRemoveList                CellIndexList                       OPTIONAL,        -- Need ON
    blackCellsToAddModList                BlackCellsToAddModList              OPTIONAL,        -- Need ON
    cellForWhichToReportCGI               PhysCellId                          OPTIONAL,        -- Need ON
    ...,
    [[measCycleSCell-r10                  MeasCycleSCell-r10                  OPTIONAL,        -- Need ON
    measSubframePatternConfigNeigh-r10 MeasSubframePatternConfigNeigh-r10
                                          OPTIONAL       -- Need ON
    ]],
    [[widebandRSRQ-Meas-r11               BOOLEAN OPTIONAL                    -- Cond WB-RSRQ
    ]],
    [[ altTTT-CellsToRemoveList-r12       CellIndexList                       OPTIONAL,        -- Need ON
    altTTT-CellsToAddModList-r12          AltTTT-CellsToAddModList-r12        OPTIONAL,        -- Need ON
    t312-r12                              CHOICE {
        release                               NULL,
        setup                                 ENUMERATED {ms0, ms50, ms100, ms200,
                                              ms300, ms400, ms500, ms1000}
    }                                                                         OPTIONAL,        -- Need ON
    reducedMeasPerformance-r12            BOOLEAN                             OPTIONAL,        -- Need ON
    measDS-Config-r12                     MeasDS-Config-r12                   OPTIONAL         -- Need ON
    ]],
    [[
    whiteCellsToRemoveList-r13            CellIndexList                       OPTIONAL,        -- Need ON
    whiteCellsToAddModList-r13            WhiteCellsToAddModList-r13          OPTIONAL,        -- Need ON
    rmtc-Config-r13                       RMTC-Config-r13                     OPTIONAL,        -- Need ON
    carrierFreq-r13                       ARFCN-ValueEUTRA-v9e0               OPTIONAL         -- Need ON
    ]]
}
CellIndexList ::=                     SEQUENCE (SIZE (1..maxCellMeas)) OF CellIndex
CellIndex ::=                         INTEGER (1..maxCellMeas)
```

In the above, ARFCN means the possible location where a carrier centre locates. The Q-offset is some offset value of a cell, which is used for a few scenarios such as cell reselection in the RRC_idle state. The intention is to setup some priority of some cells. For example when the power of Cell 1 is larger than Cell 2, a UE will camp on Cell 1. With the offset value it can be arranged that when the power of Cell 1>Cell 2+offset value, then a UE can camp on Cell 1. Default dB0 means that the default value of the offset is 0 dB.

PresenceAntennaPort1 indicates whether antenna port 1 is in use and takes the value either 0 or 1. NeighCellConfig provides information related to MBSFN and TDD UL/DL configuration of neighbour cells of this frequency. Further definitions are provided by the following Table.

| MeasObjectEUTRA field descriptions |
| --- |
| altTTT-CellsToAddModList |
| List of cells to add/modify in the cell list for which the alternative time to trigger specified by alternativeTimeToTrigger in reportConfigEUTRA, if configured, applies. |
| altTTT-CellsToRemoveList |
| List of cells to remove from the list of cells for alternative time to trigger. |
| blackCellsToAddModList |
| List of cells to add/modify in the black list of cells. |

-continued

| MeasObjectEUTRA field descriptions |
| --- | blackCellsToRemoveList

List of cells to remove from the black list of cells.

carrierFreq

Identifies E-UTRA carrier frequency for which this configuration is valid. E-UTRAN does not configure more than one measurement object for the same physical frequency regardless of the E-ARFCN used to indicate this. CarrierFreq-r13 is included only when the extension list measObjectToAddModListExt-r13 is used. If carrierFreq-r13 is present, carrierFreq (i.e., without suffix) shall be set to value maxEARFCN.

cellIndex

Entry index in the cell list. An entry may concern a range of cells, in which case this value applies to the entire range.

cellIndividualOffset

Cell individual offset applicable to a specific cell. Value dB-24 corresponds to −24 dB, dB-22 corresponds to −22 dB and so on.

cellsToAddModList

List of cells to add/modify in the cell list.

cellsToRemoveList

List of cells to remove from the cell list.

measCycleSCell

The parameter is used only when an SCell is configured on the frequency indicated by the measObject and is in deactivated state, see TS 36.133 [16, 8.3.3]. E-UTRAN configures the parameter whenever an SCell is configured on the frequency indicated by the measObject, but the field may also be signalled when an SCell is not configured. Value sf160 corresponds to 160 sub-frames, sf256 corresponds to 256 sub-frames and so on.

measDS-Config

Parameters applicable to discovery signals measurement on the carrier frequency indicated by carrierFreq.

measDuration

Number of consecutive symbols for which the Physical Layer reports samples of RSSI, see TS 36.214 [48]. Value sym1 corresponds to one symbol, sym14 corresponds to 14 symbols, and so on.

measSubframeCellList

List of cells for which measSubframePatternNeigh is applied.

measSubframePatternNeigh

Time domain measurement resource restriction pattern applicable to neighbour cell RSRP and RSRQ measurements on the carrier frequency indicated by carrierFreq. For cells in measSubframeCellList the UE shall assume that the subframes indicated by measSubframePatternNeigh are non-MBSFN subframes, and have the same special subframe configuration as PCell.

offsetFreq

Offset value applicable to the carrier frequency. Value dB-24 corresponds to −24 dB, dB-22 corresponds to −22 dB and so on.

physCellId

Physical cell identity of a cell in the cell list.

physCellIdRange

Physical cell identity or a range of physical cell identities.

reducedMeasPerformance

If set to TRUE, the EUTRA carrier frequency is configured for reduced measurement performance, otherwise it is configured for normal measurement performance, see TS 36.133 [16].

rmtc-Config

Parameters applicable to RSSI and channel occupancy measurement on the carrier frequency indicated by carrierFreq.

rmtc-Period

Indicates the RSSI measurement timing configuration (RMTC) periodicity for this frequency. Value ms40 corresponds to 40 ms periodicity, ms80 corresponds to 80 ms periodicity and so on, see TS 36.214 [48].

| MeasObjectEUTRA field descriptions |
| --- |
| rmtc-SubframeOffset |
| Indicates the RSSI measurement timing configuration (RMTC) subframe offset for this frequency. The value of rmtc-SubframeOffset should be smaller than the value of rmtc-Period, see TS 36.214 [48]. For inter-frequency measurements, this field is optional present and if it is not configured, the UE chooses a random value as rmtc-SubframeOffset for measDuration which shall be selected to be between 0 and the configured rmtc-Period with equal probability. |
| t312 |
| The value of timer T312. Value ms0 represents 0 ms, ms50 represents 50 ms and so on. |
| widebandRSRQ-Meas |
| If this field is set to TRUE, the UE shall, when performing RSRQ measurements, use a wider bandwidth in accordance with TS 36.133 [16]. |
| whiteCellsToAddModList |
| List of cells to add/modify in the white list of cells. |
| whiteCellsToRemoveList |
| List of cells to remove from the white list of cells. |

As can be seen from the above Table, the measurement configuration may include a white cell list and black cell list, respectively identifying cells which a UE should measure (white list) and should not measure (black list). From the configuration, a UE will automatically identify suitable cells (including cells not listed within the measurement configuration) to be measured and report the measurement result.

The above passages have summarised the arrangements for measurement reporting using CRS in LTE. However, due to new deployment scenarios, a new design philosophy and new technologies especially considering the beamforming technique, the design of reference symbols of NR could be significantly different compared with LTE CRS design. To guarantee meaningful and efficient NR RRM measurement, the measurement configuration information of NR has to be significantly updated as well.

FIG. 4 shows an example of an LTE system in which a first base station 21 provides a first cell, Cell 1; a second base station 22 provides a second cell, Cell 2; and a third base station provides a third cell, Cell 3. A first UE 11 is camping on Cell 1 and a second UE 12 is camping on Cell 2. Cell 1, Cell 2 and Cell 3 belong to the same operator and therefore employ the same frequency carrier (layer/component). The resource grid RG in FIG. 4 shows the CRS from antenna port 0 of one cell. As in FIG. 2, "R" indicates the location of a reference symbol in one PRB pair. Locations marked "X" denote reference symbol positions for antenna port 1 of the same cell. Although the Figure shows only one PRB pair, as already mentioned the reference signals cover the whole operating bandwidth and are repeated periodically in the time domain.

The provision of reference symbols incurs a certain "overhead"; that is, the number of reference symbols against the total available resource. As shown in FIG. 4, within 2 PRBs for antenna port 0 there are 8 reference symbols "R". As a fraction of the total number of time/frequency locations in the PRB pair, therefore, the overhead is 8/(14*12). If the number of reference symbols could be reduced, the overhead will be reduced.

UE 11 and UE 12 will perform RRM measurements (RSRP or RSRQ) based on the cell specific reference signal. The pattern of cell-specific reference signal of antenna port 0 of two PRBs is shown in the small picture at the right hand side within FIG. 4. Since the same pattern will repeat over the time domain and full system bandwidth, a UE will follow a consistent measurement process irrespective of the beginning point and the end point at the time domain, and irrespective of the location at the frequency domain, of measurement; and the measurement results will not be distorted if further processed by a Layer 1 (L1) or Layer 3 (L3) filtering.

The network operator is licensed to use a particular frequency band or carrier, referred to henceforth as a frequency layer/component. Therefore the fundamental unit of the measurement object in measurement configuration information in LTE is the particular frequency layer/component. The time, frequency or the spatial information does not need to be included in the measurement configuration message in LTE because it is assumed that the UE will measure all CRS in the same way.

FIG. 5 shows an example of a NR system where UE 11 is camping on Cell 1 and UE 12 is camping on Cell 2. Cell 1, Cell 2 and Cell 3 belong to the same frequency carrier. It is assumed that each cell will employ the above mentioned analog or digital beamforming technique, and that the beamforming pattern (the number and the direction of beams) will change within different time periods T1 and T2 as shown in the Figure.

As in LTE, the UEs will need to perform measurements on reference signals. It can be expected that these reference signals will include CRS as in LTE (or their equivalent). However, new reference signals may be introduced, for example beam-specific reference signals corresponding to individual beams from cells via analog or digital beamforming. Use of beam-specific reference signals will probably necessitate use of a beam identifier or "beam ID" which does not exist in LTE. If introduced, the beam ID will be a physical layer concept and a UE will work out a beam ID through special signal such as synchronization signal.

During the time duration T1, it makes sense for UE 11 to compare the measurement results of Cell 1 and Cell 2 to decide whether to trigger related further measurement(s) or prepare a handover. However, it is not reasonable for UE 11 to determine that Cell 3 is a non-suitable cell based on measurement results on Cell 3 during T1, because as FIG. 4 shows the beam of Cell 3 pointing away from UE1 in T1, making Cell 3 hard to detect by UE1.

In fact a more reasonable method is not to permit UE 11 to perform any measurement on Cell 3 during time period T1. In this way UE 11 will reduce power consumption used for measurement and also does not get unreliable measurement data at the same time.

In general the reference signal design for NR could be frequency dependent due to:
  (i) Different density/pattern for different numerology
  (ii) Different density/pattern in order to save overhead. It could be further time dependent due to 1 different numerology; 2 overhead saving
  (iii) Beamforming operation. Moreover, there could be multiple tiers/levels of reference signal for NR, such as cell specific reference signals and beam specific reference signals.

Therefore the measurement configuration message in LTE where the measurement object is carrier frequency dependent, is not suitable for NR and has various shortcomings as follows.

Firstly, the scheme used for LTE cannot reduce measurement complexity when transmission of reference signals is temporarily switched off at a cell. Secondly, after L1 filtering or L3 filtering useful information will be hidden or the result may be a distorted result. For example in FIG. 3, it does not make sense to average the measurement results of either UE 11 or UE 12 over time durations T1 and T2. Thirdly, there is a feasibility issue: in NR a terminal does not always support the system bandwidth; in any case, when carrying out beam level measurement extra information such as beam ID is required, which is not supported by the current message structure.

Therefore the message structure of measurement configuration needs be re-designed for the NR system.

SUMMARY OF THE INVENTION

As already mentioned, the reference signal design for 5G NR (New Radio) could be quite different compared with that of LTE, including that it may be time/frequency/spatial dependent. The measurement configuration message, which is sent by a base station (e.g., "gNB") to the UE to configure RRM measurements, needs to be significantly modified in order that it satisfies the property of the 5G NR. In embodiments, various solutions for the measurement configuration message(s) are provided.

More particularly, although in LTE the measurement configuration message is per frequency carrier dependent, which is suitable for LTE system, embodiments of the present invention allow a measurement configuration message to configure a measurement object over a particular time duration, frequency range, time/frequency grid, and/or a particular beam or frequency layer in order to satisfy various requirements on RRM measurement of NR.

According to a first aspect of the present invention, there is provided a method of configuring a terminal in a wireless communication system for reporting of measurements, the terminal arranged to detect at least one beam transmitted from a base station in at least one frequency layer, the method comprising:
  defining multiple measurement objects for the terminal,
    each measurement object applicable to at least one of:
    different time durations, different frequency ranges, different beam identities and different frequency layers; and
  configuring the terminal for reporting using the measurement objects so defined.

Here, "time duration" refers to a time period during which at least one measurement should be made by the terminal. "Frequency range" refers to a range of frequencies in which the terminal should make a measurement. In a preferred embodiment, each of the measurement objects is applicable to a respective time/frequency grid within resources available for detection/measurement by the terminal. The "time/frequency grid" may be a defined area on a resource grid extending over a defined number of symbols and subcarriers and within which at least one measurement should be made.

Preferably the terminal is arranged to detect a plurality of frequency layers and each measurement object is defined for a specific frequency layer. The plurality of frequency layers may be provided by the same base station.

The terminal may be arranged to detect a plurality of beams from at least one base station in at least one frequency layer, in which case each measurement object can be both time/frequency and beam dependent; also, in this case the measurement object may further define a beam identity.

A terminal (UE) may not be equipped to detect signals across the whole system bandwidth. Accordingly, each measurement object may have an associated measurement bandwidth which is the minimum value between the bandwidth indicated by UE capability information and system information.

In any method as defined above, the base station may transmit a configuration message to the terminal, and the configuration message may include (or may relate to) one said measurement object (with separate configuration messages for other measurement objects). Alternatively the configuration message may include (or relate to) a plurality of said measurement objects.

Each measurement configuration may be for causing the terminal to measure reference signals transmitted by the base station, the reference signals transmitted using said at least one of the different time durations, different frequency ranges, different beam identities and different frequency layers.

In response to the or each configuration message the terminal may create at least one measurement object list, for recording the measurement objects applicable to one said frequency layer, or applicable to a given time period, etc.

In another embodiment (which is also the subject of the second aspect referred to below), the measurement objects include two or more measurement objects applicable to an identical time duration, frequency range, time/frequency grid, beam identity, frequency layer or a combination thereof. The terminal delivers measurement reports to a base station based on at least one of a plurality of different reporting configurations, and the identical time duration, frequency range, time/frequency grid, beam identity or frequency layer is a subset of those available to the terminal.

According to a second aspect of the present invention, there is provided a method of configuring a terminal in a wireless communication system for reporting of measurements, the terminal arranged to detect at least one beam transmitted from a base station in at least one frequency layer, the method comprising:
  configuring, for the terminal, multiple report configurations applicable to an identical time duration, frequency range, time/frequency grid, beam identity, frequency layer or a combination thereof; and
  the terminal delivering measurement reports to a base station based on at least one of said report configurations, and the identical time duration, frequency range, time/frequency grid, beam identity or frequency layer is a subset of those available to the terminal.

According to a third aspect of the present invention, there is provided a wireless communication system comprising a terminal and a base station, the base station configured to:
transmit at least one beam in at least one frequency layer, and
configure the terminal with multiple measurement objects, each measurement object applicable to at least one of: different time durations, different frequency ranges, different beam identities, and different frequency layers; and the terminal arranged to:
perform measurements for each of the measurement objects so configured.

According to a fourth aspect of the present invention, there is provided a base station in a wireless communication system, arranged to:
transmit at least one beam in at least one frequency layer to a terminal, and
configure the terminal with multiple measurement objects, each measurement object applicable to at least one of: different time durations, different frequency ranges, different beam identities, and different frequency layers.

According to a fourth aspect of the present invention, there is provided a terminal in a wireless communication system, arranged to:
receive configuration of multiple measurement objects, each measurement object applicable to at least one of: different time durations, different frequency ranges, different beam identities, and different frequency layers; and
perform measurements for each of the measurement objects so configured.

The above system, base station and terminal may include any of the features outlined above with respect to the method of the first or second aspects.

Thus, features in embodiments include any one or more of the following:
A method which is designed for the measurement configuration in a communication system with multi-beam/single-beam operation, comprising:
Enabling the system to define multiple measurement objects for a particular UE
For a particular terminal and a particular frequency layer/component, defining multiple measurement objects over different time durations
For a particular terminal and a particular frequency layer/component, defining multiple measurement objects over different frequency ranges
For a particular terminal and a particular frequency layer/component, defining multiple measurement objects over different time/frequency grids
For a particular terminal and a particular frequency layer/component, defining multiple measurement objects over different beam identities
For a particular terminal and a particular frequency layer/component, defining multiple measurement objects over different resources where the resources can be a combination of aforementioned time duration, frequency range, time/frequency grid or beam identity
The measurement bandwidth within each measurement object is the minimum value between the bandwidth indicated by UE capability information and system information.

Embodiments may further include:
A method which is designed for the measurement configuration in a communication system with multi-beam/single-beam operation, comprising:
For a particular terminal, defining multiple report configurations over an identical time duration, frequency range, time/frequency grid or beam identity or a combination of them.

In general, and unless there is a clear intention to the contrary, features described with respect to one aspect of the invention may be applied equally and in any combination to any other aspect, even if such a combination is not explicitly mentioned or described herein.

The term "cell" used above is to be interpreted broadly, and may include, for example, parts of a cell, a beam, or the communication range of a transmission point or access point. As mentioned earlier, cells are normally provided by base stations. Each cell is associated with at least one carrier frequency and frequency band (also referred to below as layer or component), which is a range of wireless frequencies used by the cell. Base stations may take any form suitable for transmitting and receiving signals from other stations in a 5G system, and may be referred to for example as "gNB".

The "terminal" referred to above may take the form of a user equipment (UE), subscriber station (SS), or a mobile station (MS), or any other suitable fixed-position or movable form. For the purpose of visualising the invention, it may be convenient to imagine the terminal as a mobile handset (and in many instances at least some of the terminals will comprise mobile handsets), however no limitation whatsoever is to be implied from this.

BRIEF DESCRIPTION OF THE DRAWINGS

Reference is made, by way of example only, to the accompanying drawings in which.

DETAILED DESCRIPTION

The invention will be described with reference to embodiments based on a 5G/NR which is assumed to share many characteristics with LTE.

Figure 1:
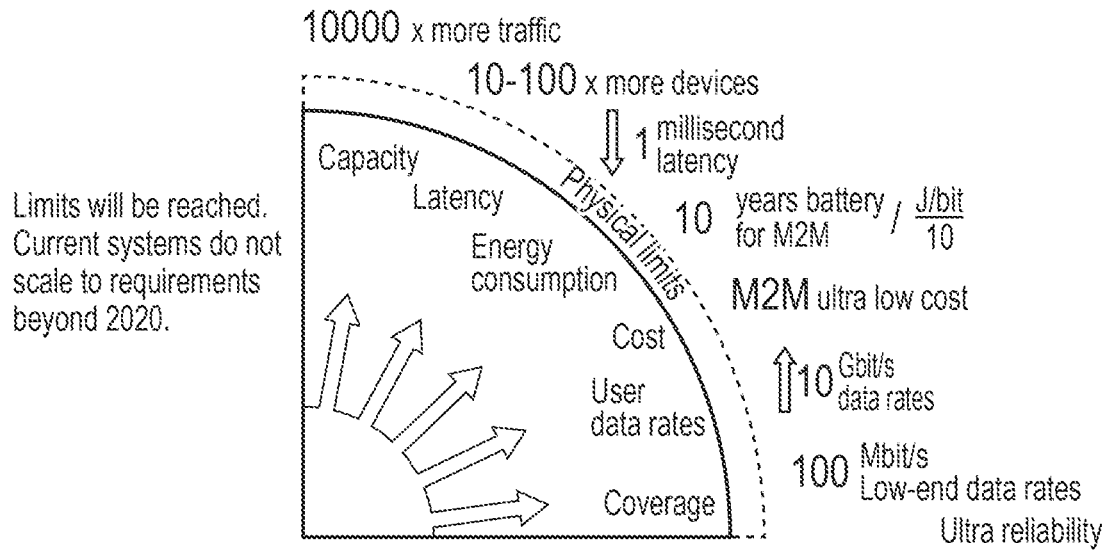
FIG. 1 illustrates requirements for a 5G wireless communication system.
Figure 2:
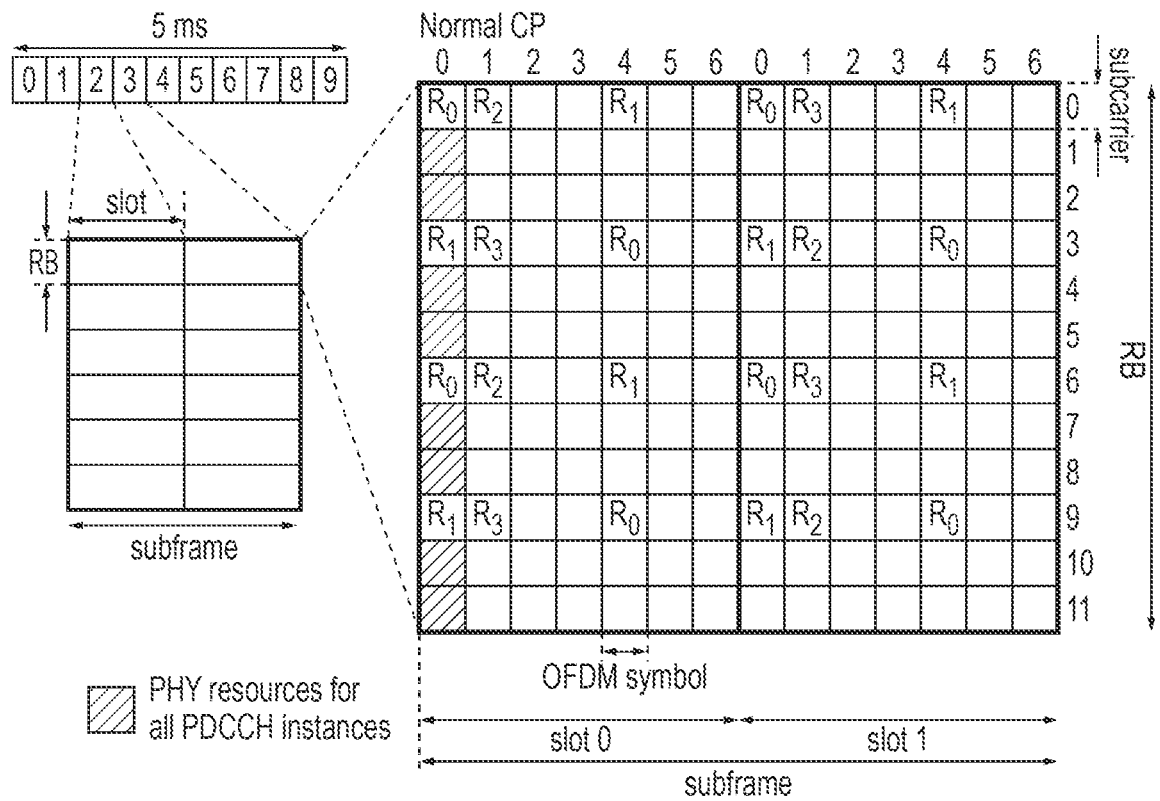
FIG. 2 shows a frame structure in LTE including a PRB pair.
Figure 3:
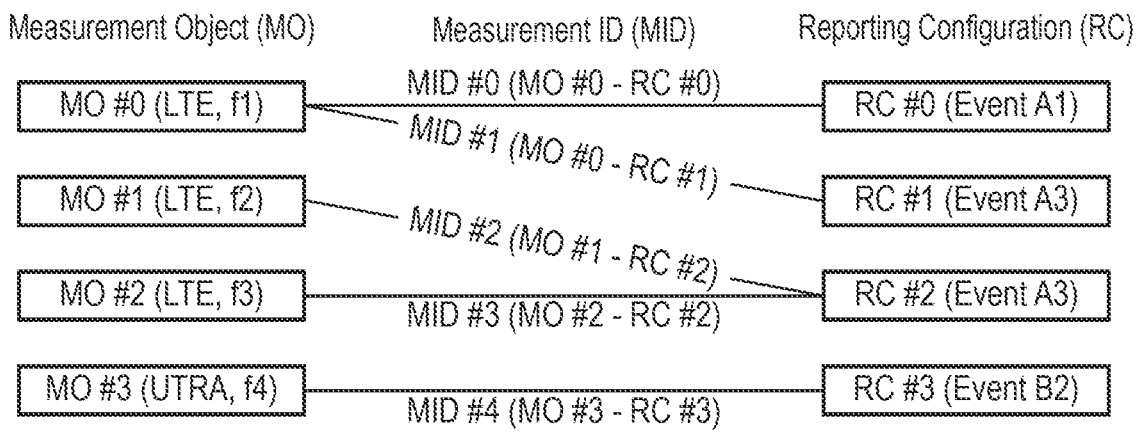
FIG. 3 shows the relationship between a measurement object, measurement ID and reporting configuration in LTE.
Figure 4:
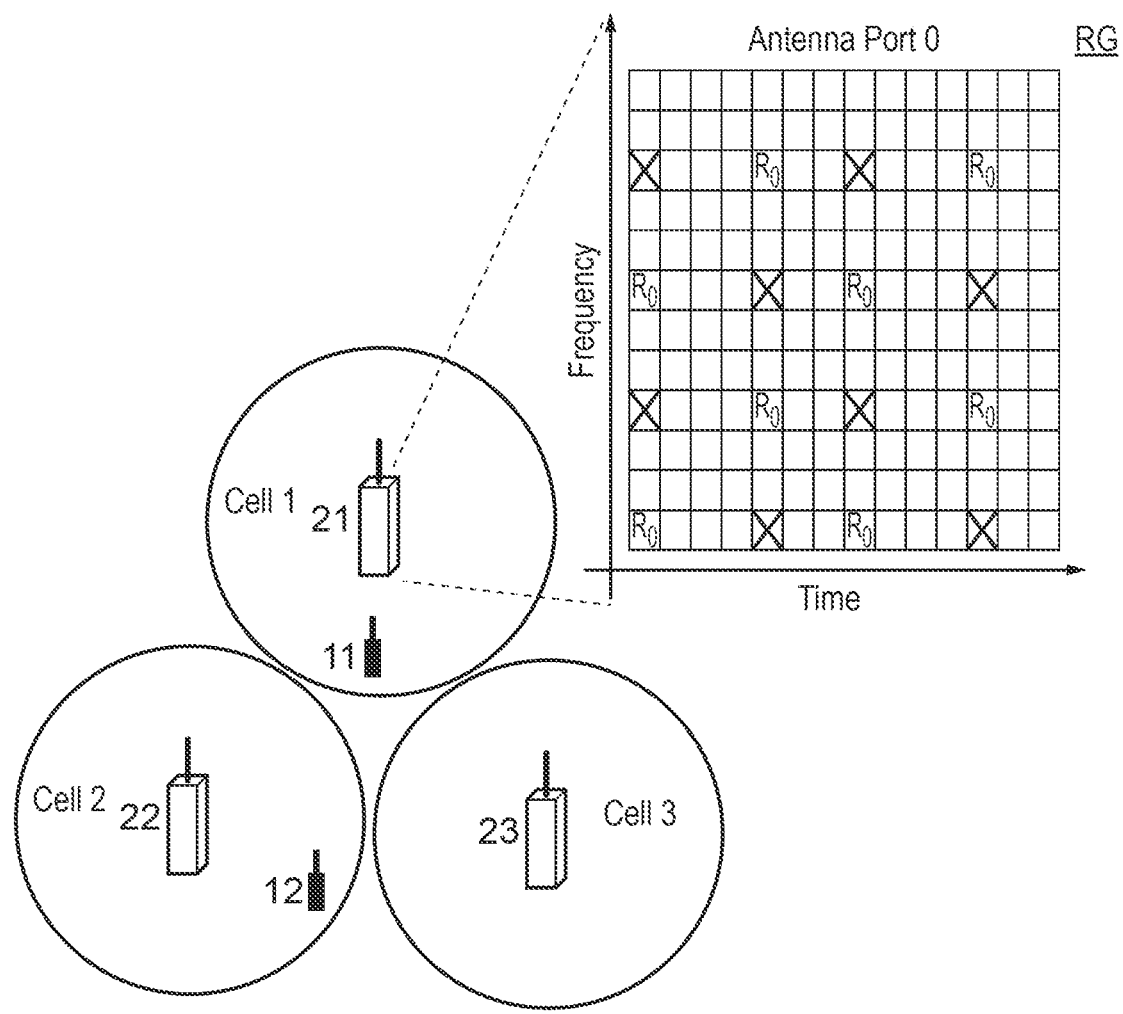
FIG. 4 illustrates RRM measurements of multiple cells by UEs in LTE.
Figure 5:
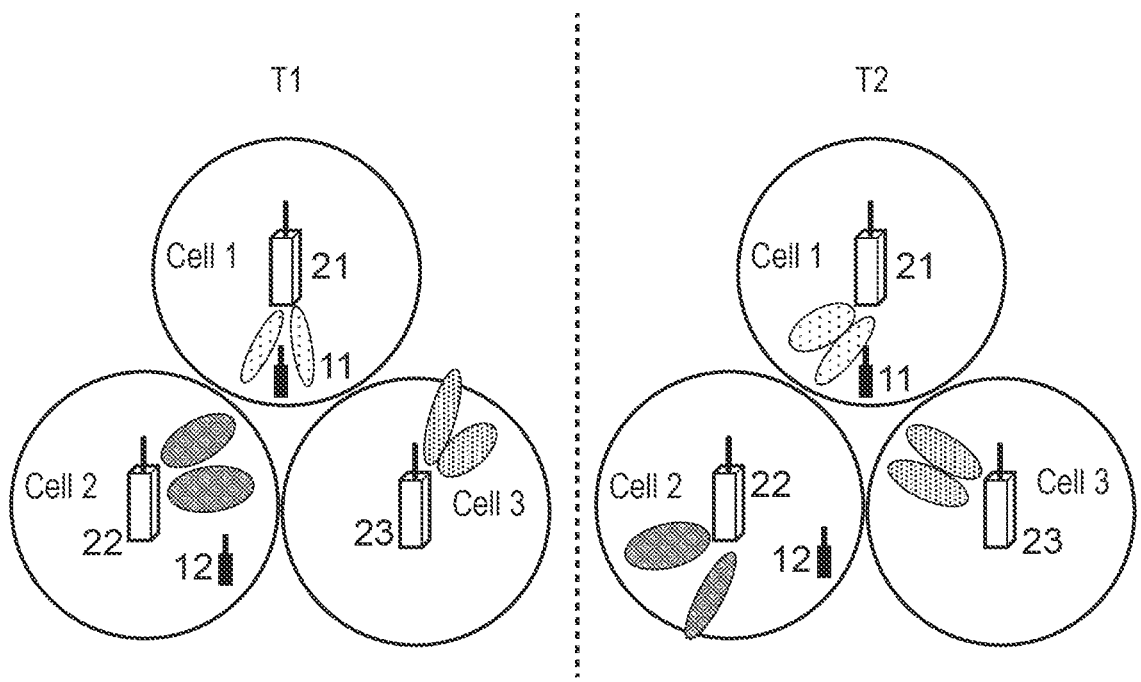
FIG. 5 illustrates a set of New Radio (NR) cells with beamforming operation.

Based on the discussion above, a principle employed in embodiments is to create a new measurement object configuration definition which allows the measurement object configuration to be independent of carrier frequency (layer). The measurement object configuration is independent of carrier frequency in the sense that the new design will allow multiple measurement objects to be configured for one particular carrier frequency whereas in LTE only one measurement object is allowed to be configured for a particular carrier frequency. The measurement object configuration can specify different time/frequency/spatial resources for each measurement object. This will overcome the limitation/incapability of measurement configuration mentioned before and provide a method where various measurement configurations can be used for different measurement purposes. Use of this principle allows different measurement objects to be composed which are dependent on extra configuration information being introduced. In other words, use of the above principle will increase the "resolution" of measurement objects which allows a measurement object to consider/incorporate time/frequency/spatial domain resources that could not be considered/incorporated before. The measurement object configuration in embodiments of the present invention can re-use the techniques known for LTE and described in the introduction, including the combination of MO, MID and RC as shown in FIG. 3. However, in implementation terms a change in 3GPP standards will be needed to include novel parameters as part of a measurement object configuration.

A first embodiment, employing the above principle, is to form a measurement object over a particular time duration, i.e., the measurement object is time dependent. This means that multiple measurement objects may be defined applicable to different time durations. It should be noted that the "time duration" here refers to a time period within which the terminal should make a measurement, as distinct from a time period of validity of the measurement configuration. The measurement configuration may remain valid indefinitely, until cancelled or replaced by a future measurement configuration.

Figure 6:
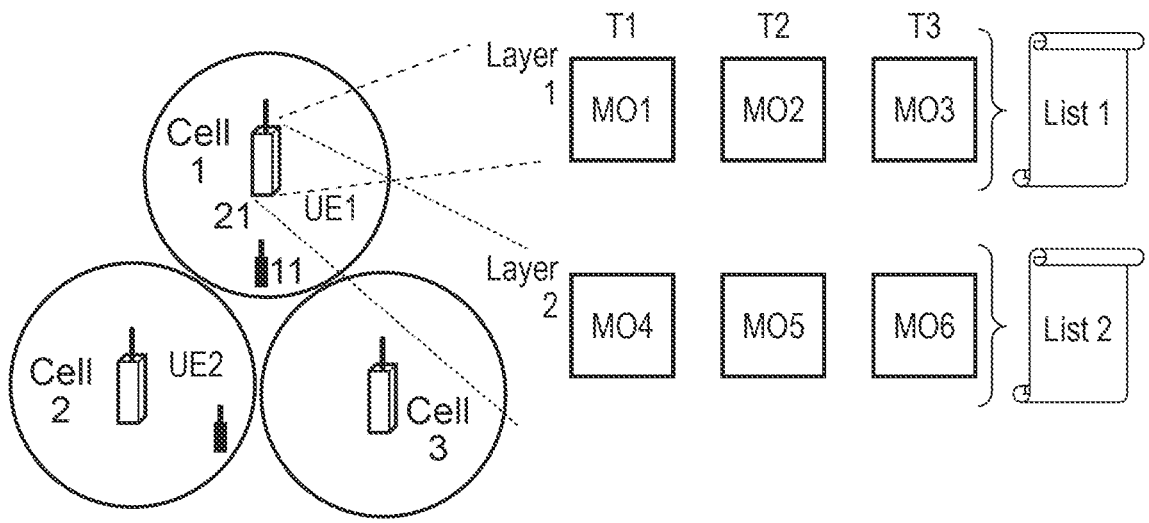
FIG. 6 schematically illustrates a first embodiment.

FIG. 6 shows schematically the operation in this embodiment. As before, 21 denotes a base station and T1 and T2 are time periods of operation of this base station, with a further time period T3 added in this example. For example, time periods T1, T2 and T3 may repeat cyclically over one or more frames, although this is not essential. The base station operates with multiple carriers; that is, it has more than one frequency component or layer available to it, as indicated by Layer 1 and Layer 2.

For each of the Layers, the base station configures a set of measurement objects: MO1, MO2 and MO3 for Layer 1, and MO4, MO5 and MO6 in the case of Layer 2. In this example, MO1 applies to time period T1, MO2 to T2, and MO3 to T3. Each of these sets of measurement objects is notified to terminal 11 which forms at least one measurement object list: in this case a first list, List1 for Layer 1 and a second list, List2 for Layer 2. The lists may of course be consolidated into a single list so long as the relevant layer is identified for each measurement object. The configuration process can be repeated for further Layers and/or time periods of operation. The configuration may be by a separate RRCConnectionReconfiguration message (or equivalent) for each measurement object, by a collective message for all measurement objects of the same Layer, or by a collective message for all measurement objects in all layers.

To implement the above embodiment, one possibility is to add a new IE into the measurement object structure based on current measurement object structure for LTE, as shown in the following example:

| | |
|---|---|
| MeasObjectNR ::= | SEQUENCE { |
| carrierFreq | ARFCN-ValueEUTRA, |
| allowedMeasBandwidth | AllowedMeasBandwidth, |
| allowedMeasTimeDuration | AllowedMeasTimeDuration, |

-continued

| | | |
|---|---|---|
| presenceAntennaPort1 | PresenceAntennaPort1, | |
| neighCellConfig | NeighCellConfig, | |
| offsetFreq | Q-OffsetRange | DEFAULT dB0, |
| -- Cell list | | |
| ... | | |
| } | | |

Here (and likewise in the following embodiments), bold type indicates a novel addition to the measurement object in the present invention. The configuration is labelled "MeasObjectNR" to denote that it is for 5G/NR. In this case, the added parameter "allowedMeasTimeDuration" is a time period within which to take measurements, which measurements could be repeated within the period if required. It may not be necessary for the terminal to measure throughout this time period. One possibility for use of the novel parameter allowedMeasTimeDuration is to tell the UE only to perform measurements whilst certain reference signals are being transmitted. Another possibility is to measure a special beam when the beam's direction is pointing toward that UE. In either case it is a parameter at the time domain to control when a UE to start and stop measurement, if necessary. Such kind of control does not exist in LTE and it is also not necessary for LTE.

A second embodiment, employing the above principle, is to form a measurement object over a particular frequency range, i.e., the measurement object is frequency range dependent. In LTE, a UE will support all possible system bandwidth whereas a NR UE will not necessarily support all possible system bandwidth. Therefore, the UE capability should be considered in the measurement object configuration. The UE capability should be known by the system when a UE accesses the system, so this parameter can be communicated as part of the measurement object. One solution is to add a new IE into the measurement object structure based on the current measurement object structure for LTE, and more particularly by redefining the already existing IE allowedMeasBandwidth. The new definition could be:

allowedUEMeasBandwidth=min {bandwidth supported based on UE capability, measurement bandwidth indicated by system information}

One example implementation is shown as below:

| | | |
|---|---|---|
| MeasObjectNR ::= | SEQUENCE { | |
| carrierFreq | ARFCN-ValueEUTRA, | |
| allowedUEMeasBandwidth | AllowedUEMeasBandwidth, | |
| allowedMeasFreqRange | AllowedMeasFreqRange, | |
| presenceAntennaPort1 | PresenceAntennaPort1, | |
| neighCellConfig | NeighCellConfig, | |
| offsetFreq | Q-OffsetRange | DEFAULT dB0, |
| -- Cell list | | |
| ... | | |
| } | | |

In the above measurement object, there is a second novel parameter "allowedMeasFreqRange" which instructs the UE to measure part of the possible bandwidth. In other words, allowedMeasFreqRange is a subset of allowedUEMeasBandwidth. Regarding the part of the bandwidth not covered by allowedMeasFreqRange, this could be covered by a separate configuration message; or, as a variation of this embodiment, one message could include multiple configurations for different frequency ranges.

A third and preferred embodiment, employing the above principle, is to form a measurement object over a particular time/frequency grid, i.e., a defined area on a resource grid such as that shown in FIG. 3. In this way, the measurement object is time/frequency dependent. Similarly to the above mentioned first and second embodiments, a new IE can be added into the measurement object structure based on the current measurement object structure for LTE, as shown in the following example (the UE capability based measurement bandwidth mentioned in the second embodiment is also considered here):

```
MeasObjectNR ::=            SEQUENCE {
    carrierFreq                 ARFCN-ValueEUTRA,
    allowedUEMeasBandwidth      AllowedUEMeasBandwidth,
    allowedMeasTimFreqGrid      AllowedMeasTimeFreqGrid,
    presenceAntennaPort1        PresenceAntennaPort1,
    neighCellConfig             NeighCellConfig,
    offsetFreq                  Q-OffsetRange    DEFAULT dB0,
    -- Cell list
    ...
}
```

As before, "MeasTim" here denotes a time period for the UE to take measurements. Thus, the network configures the UE with a range of time/frequency grid, and the UE measures one or more reference signals amongst this particular time/frequency grid.

Again as a variation of this embodiment, one message could include multiple configurations for different frequency time/frequency grids, for example within the same subframe.

A fourth embodiment, employing the above principle, is to form a measurement object over a particular time/frequency grid and one or multiple beams, i.e., the measurement object is time/frequency and beam identity dependent. As already mentioned, it is expected that a Beam ID is introduced with NR, and this ID can be used to form a "beam list" in a similar manner to a "cell list" in LTE. Similarly to former embodiments, a new IE can be added into the measurement object structure based on current measurement object structure for LTE, as shown in the following example:

```
MeasObjectNR ::=            SEQUENCE {
    carrierFreq                 ARFCN-ValueEUTRA,
    allowedUEMeasBandwidth      AllowedUEMeasBandwidth,
    allowedMeasTimFreqGrid      AllowedMeasTimeFreqGrid,
    presenceAntennaPort1        PresenceAntennaPort1,
    neighCellConfig             NeighCellConfig,
    offsetFreq                  Q-OffsetRange    DEFAULT dB0,
    -- Beam list
    beamsToRemoveList           BeamIndexList
    beamsToAddModList           BeamsToAddModList
    -- Cell list
    ...
}
```

As will be apparent from comparing the above format with the conventional one given in the introduction, two novel lists "beamsToRemoveList" and "beamstoAddModList" are provided, analogous to the message structure used for cells in LTE (cellsToRemoveList, cellstoAddModList). Providing two lists in this way reuses the already existing message structure for ease of implementation.

A fifth embodiment is to allow a UE create and maintain multiple measurement object lists for a particular carrier frequency layer/component. Each measurement object list can consist of one type of measurement objects defined in the earlier embodiments. For example, therefore, a separate list may be maintained for each frequency layer. The current procedure in LTE is that the base station provides all the measurement object configuration in one go and when the configuration needs to be updated, the base station will provide a new configuration. The same procedure can be reused by NR.

Regarding the report configuration, it is preferred to allow a report configuration to be able to consider the aforementioned extra configuration information as well.

A sixth embodiment (which can either be combined with any of the preceding embodiments, or be used in isolation) is to allow time duration information, frequency range information, time/frequency grid information or beam identity information to be included in one particular report configuration, but where, different report configurations can be set up over the same resources. For example, over one particular time/frequency grid, multiple report configurations can be set up where different report configurations may have either different trigger quantity conditions, report quantity conditions or report intervals etc.

Here the intention is to vary the reporting rules even the measurement target may remain the same. Supposing a terminal tries to measure a reference signal with frequency/time resource A, there could be two measurement objects (Ob1 and Ob2) configured for resource A. Then, the measurement result of Ob1 is reported to the network when condition 1 is satisfied, and the Ob2 measurement result is reported when condition 2 is satisfied.

Figure 7:
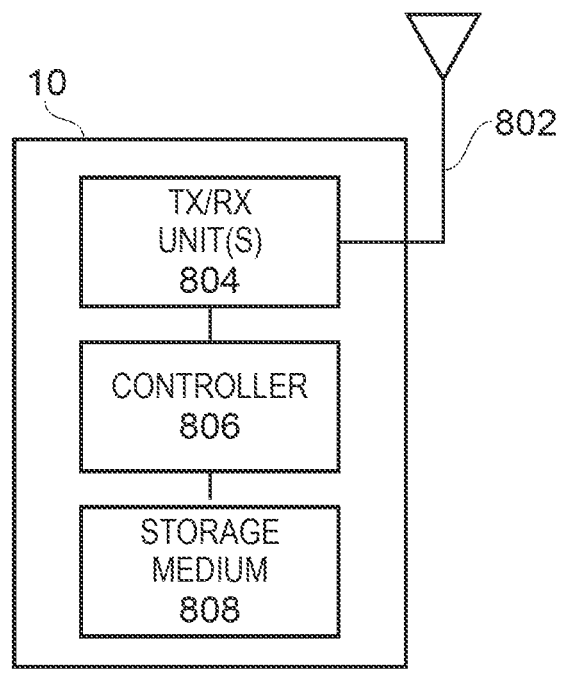
FIG. 7 is a schematic block diagram of a terminal to which the present invention may be applied.

FIG. 7 is a block diagram illustrating an example of a terminal 10 to which the present invention may be applied. The terminal 10 may include any type of device which may be used in a wireless communication system described above and may include cellular (or cell) phones (including smartphones), personal digital assistants (PDAs) with mobile communication capabilities, laptops or computer systems with mobile communication components, and/or any device that is operable to communicate wirelessly. The terminal 10 includes transmitter/receiver unit(s) 804 connected to at least one antenna 802 (together defining a communication unit) and a controller 806 having access to memory in the form of a storage medium 808. The controller 806 may be, for example, a microprocessor, digital signal processor (DSP), application-specific integrated circuit (ASIC), field-programmable gate array (FPGA), or other logic circuitry programmed or otherwise configured to perform the various functions described above, including performing measuring signals, applying any filtering and constructing measurement reports. For example, the various functions described above may be embodied in the form of a computer program stored in the storage medium 808 and executed by the controller 806. The transmission/reception unit 804 is arranged, under control of the controller 806, to detect transmissions from base stations including CRS or equivalent, as discussed previously. The storage medium 808 stores the measurements obtained on detected signals.

Figure 8:
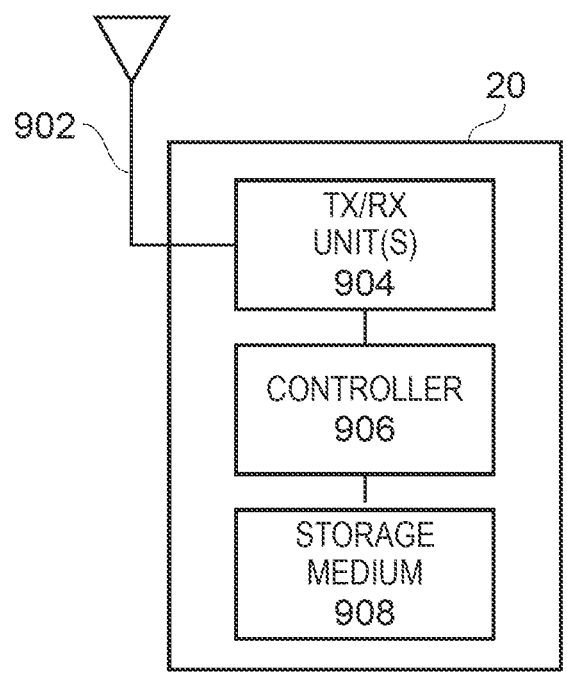
FIG. 8 is a schematic block diagram of a base station to which the present invention may be applied.

FIG. 8 is a block diagram illustrating an example of a base station (gNB) 20 responsible for one or more cells. The base station includes transmitter/receiver unit(s) 904 connected to at least one antenna 902 (together defining a communication unit) and a controller 906. The controller may be, for example, a microprocessor, DSP, ASIC, FPGA, or other logic circuitry programmed or otherwise configured to perform the various functions described above, including generating measurement objects for each terminal 10 connected to the base station. For example, the various functions described above may be embodied in the form of a computer program stored in the storage medium 908 and executed by the controller 906. The transmission/reception unit 904 is responsible for broadcasting reference signals and transmitting measurement configurations etc., under control of the controller 906.

Thus, to summarise, embodiments of the present invention provide measurement object configuration for 5G/NR wireless communication which is independent of carrier frequency, allowing multiple measurement objects to be configured for the same carrier frequency. Each measurement object can be defined over a particular time duration, frequency range, time/frequency grid, and/or a particular beam in order to satisfy various requirements on RRM measurement of NR. Thus, for a particular terminal and a particular carrier frequency (layer or component), multiple measurement objects can be defined over different time/frequency grids.

Various modifications are possible within the scope of the present invention.

The invention is equally applicable to FDD and TDD systems, and to mixed TDD/FDD implementations (i.e., not restricted to cells of the same FDD/TDD type). References in the claims to a "terminal" are intended to cover any kind of user device, subscriber station, mobile terminal and the like and are not restricted to the UE of LTE.

The term "cell" is to be interpreted broadly and includes parts of a cell, a beam, and the coverage area of an access point, transmission point or other network node.

In any of the aspects or embodiments of the invention described above, the various features may be implemented in hardware, or as software modules running on one or more processors.

Features of one aspect may be applied to any of the other aspects.

The invention also provides a computer program or a computer program product for carrying out any of the methods described herein, and a computer readable medium having stored thereon a program for carrying out any of the methods described herein.

A computer program embodying the invention may be stored on a computer-readable medium, or it may, for example, be in the form of a signal such as a downloadable data signal provided from an Internet website, or it may be in any other form.

It is to be clearly understood that various changes and/or modifications may be made to the particular embodiment just described without departing from the scope of the claims.

INDUSTRIAL APPLICABILITY

Embodiments of the present invention allow a measurement configuration message to configure a measurement object over a particular time duration, frequency range, time/frequency grid, and/or a particular beam or frequency layer in order to satisfy various requirements on RRM measurement of NR. In this way, the measurement object configuration can specify different time/frequency/spatial resources for each measurement object. This will overcome the limitation/incapability of conventional measurement configuration, allowing various measurement configurations to be used for different measurement purposes and thereby providing flexible measurement reporting in a next-generation wireless network.

What is claimed is:

1. A method of configuring a terminal in a wireless communication system for reporting of radio resource measurements, RRM, the terminal arranged to detect at least one beam transmitted from a base station in at least one frequency layer, the method comprising:
   defining multiple measurement objects for the terminal, each measurement object applicable to at least one of: different time durations, different frequency ranges, different beam identities and different frequency layers;
   sending a measurement configuration message to configure two or more measurement objects over a particular time duration, wherein the measurement configuration is for detection or measurement of reference signals transmitted by the base station the reference signals transmitted using said at least one of the different time durations, different frequency ranges, different beam identities and different frequency layers corresponding to each measurement object; and
   configuring the terminal for reporting using the measurement objects so configured.

2. The method according to claim 1 wherein each of the measurement objects is applicable to a respective grid of time against frequency within resources available for detection or measurement by the terminal.

3. The method according to claim 2 wherein the terminal is arranged to detect a plurality of frequency layers and each measurement object is defined for a specific frequency layer.

4. The method according to claim 1 wherein the terminal is arranged to detect a plurality of beams from at least one base station in at least one frequency layer and each measurement object is both time and frequency and beam dependent.

5. The method according to claim 4 wherein each measurement object further defines a beam identity.

6. The method according to claim 1 wherein each measurement object has an associated measurement bandwidth which is the minimum value between the bandwidth indicated by UE capability information and system information.

7. The method according to claim 1 further comprising the base station transmitting the configuration message to the terminal, the configuration message including one measurement object or a plurality of said measurement objects.

8. The method according to claim 1 further comprising the terminal creating at least one measurement object list, the at least one measurement object list recording the measurement objects applicable to one said frequency layer.

9. The method according to claim 1 wherein said measurement objects include two or more measurement objects applicable to an identical time duration, frequency range, grid of time against frequency, beam identity, frequency layer or a combination thereof, the terminal delivers measurement reports to a base station based on different reporting configuration, and the identical time duration, frequency range, time/frequency grid, beam identity or frequency layer is a subset of those available to the terminal.

10. A method of configuring a terminal in a wireless communication system for reporting of measurements, the terminal arranged to detect at least one beam transmitted from a base station in at least one frequency layer, the method comprising:
   configuring, for the terminal, multiple measurement objects applicable to an identical time duration, frequency range, time/frequency grid, beam identity, frequency layer or a combination thereof;
   receiving, at the terminal, a measurement configuration message to configure two or more measurement objects over a particular time duration, wherein the measurement configuration is for detection or measurement of reference signals transmitted by the base station, the reference signals transmitted using said at least one of the different time durations, different frequency ranges, different beam identities and different frequency layers corresponding to each measurement object; and the terminal delivering measurement reports to a base station based on at least one of said measurement objects, where the identical time duration, frequency range, grid of time against frequency, beam identity or frequency layer is a subset of those available to the terminal.

11. A wireless communication system comprising a terminal and a base station, the base station comprising an antenna connected to at least one transmitter unit and a controller configured to:

control the transmitter unit to transmit at least one beam in at least one frequency layer, to configure the terminal with multiple measurement objects, each measurement object applicable to at least one of: different time durations, different frequency ranges, different beam identities, and different frequency layers; and to control the transmitter unit to send a measurement configuration message to configure two or more measurement objects over a particular time duration, wherein the measurement configuration is for detection or measurement of reference signals transmitted by the base station, the reference signals transmitted using said at least one or the different time durations, different frequency ranges, different beam identities and different frequency layers corresponding to each measurement object; and the terminal comprising a controller arranged to:

perform measurements for each of the measurement objects so configured.

12. A base station in a wireless communication system, comprising: an antenna connected to at least one transmitter unit and a controller arranged to:

control the transmitter unit to transmit at least one beam in at least one frequency layer to a terminal, to configure the terminal with multiple measurement objects, each measurement object applicable to at least one of: different time durations, different frequency ranges, different beam identities, and different frequency layers; and to control the transmitter unit to send a measurement configuration message to configure two or more measurement objects over a particular time duration, wherein the measurement configuration is for detection or measurement of reference signals transmitted by the base station, the reference signals transmitted using said at least one or the different time durations, different frequency ranges, different beam identities and different frequency layers corresponding to each measurement object.

13. A terminal in a wireless communication system, comprising: an antenna connected to at least one receiver unit and a controller, the controller arranged to:

control the receiver unit to receive configuration of multiple measurement objects, each measurement object applicable to at least one of: different time durations, different frequency ranges, different beam identities, and different frequency layers;

the receiver unit arranged to receive a measurement configuration message to configure two ore more measurement objects over a particular time duration, wherein the measurement configuration is for detection or measurement of reference signals transmitted by the base station, the reference signals transmitted using said at least one of the different time durations, different frequency ranges, different beam identities and different frequency layers corresponding to each measurement object; and the controller arranged to perform measurements for each of the measurement objects so configured.

14. Non-transitory computer-readable media storing instructions which, when executed by a processor of a transceiver-equipped computing device provides a base station arranged to:

transmit at least one beam in at least one frequency layer to a terminal;

configure the terminal with multiple measurement objects, each measurement object applicable to at least one of: different time durations, different frequency ranges, different beam identities, and different frequency layers; and to send a measurement configuration message to configure two or more measurement objects over a particular time duration, wherein the measurement configuration is for detection or measurement of reference signals transmitted by the base station, the reference signals transmitted using said at least one or the different time durations, different frequency ranges, different beam identities and different frequency layers corresponding to each measurement object.

* * * * *